Jan. 31, 1967 E. J. GRICHNIK 3,301,583
SPRING LOADED JAW AND HOOK ASSEMBLY
Filed Dec. 21, 1964 2 Sheets-Sheet 2

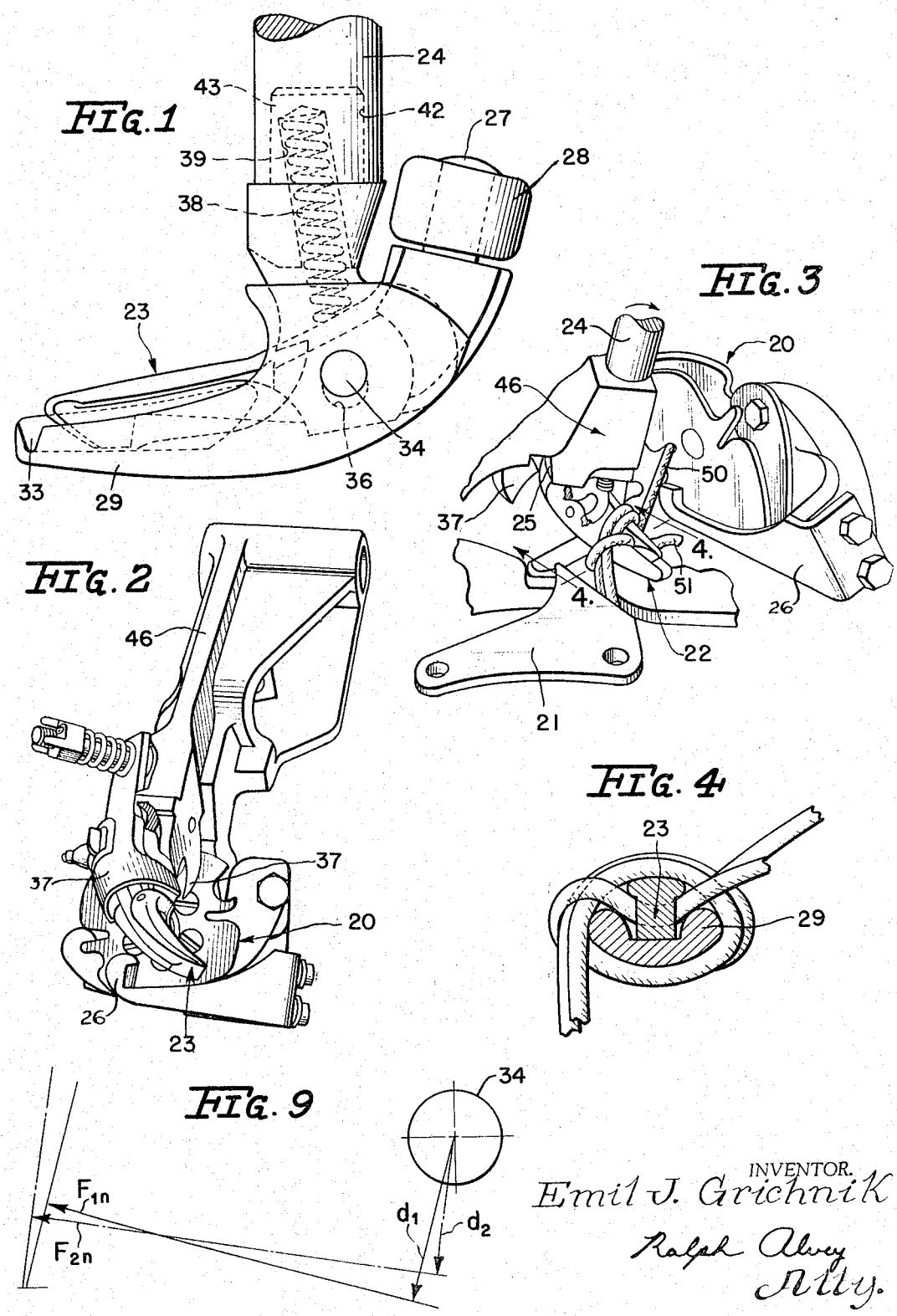

INVENTOR.
Emil J. Grichnik
BY Ralph Alvey
Atty.

United States Patent Office 3,301,583
Patented Jan. 31, 1967

3,301,583
SPRING LOADED JAW AND HOOK ASSEMBLY
Emil J. Grichnik, Memphis, Tenn., assignor to International Harvester Company, a corporation of Delaware
Filed Dec. 21, 1964, Ser. No. 419,706
9 Claims. (Cl. 289—11)

This invention pertains to a twine knotter unit for a bale-typing mechanism, in particular, to a knotter hook assembly having a spring-loaded jaw that automatically compensates for irregularities in the twine size.

Many parts of current twine knotters have a fixed dimensional relation to one another. Hence, when irregularities occur in the twine size, the knotter is unable to cope with them and malfunctions. One of these fixed parts is the jaw of the knotter hook.

Being mounted on a fixed pivot axis, the jaw of the conventional knotter hook has limited ability to handle either oversize or undersize twine. When the twine is oversize, the jaw cannot close completely on both ends of the strand of twine encircling a bale, so that one end of the strand may come loose from the knotter and cause a mis-tie. When the twine is undersize, it may be too weak to withstand the force applied in opening the jaw and may break, again causing a mis-tie.

OBJECTS

The object of this invention is, in general, to provide a knotter hook assembly that automatically compensates for certain irregularities in the twine and, thereby, reduces knotter malfunctions. One specific object of the invention is to provide a knotter hook assembly having a spring-loaded jaw capable of exerting a firm grip on both ends of a strand of oversize twine. A second object of the invention is to provide a knotter hook assembly having a variable jaw-opening torque radius, whereby the force required to open the jaw depends on the size of the twine strand. Another specific object of the invention is to provide a knotter hook assembly having a variable jaw-opening torque radius, whereby the jaw opens in response to a smaller force when an undersize strand of twine is encountered.

DRAWINGS

The best mode contemplated for carrying out the present invention is shown in the attached drawings, where:

FIG. 1 is a side elevation of a knotter billhook assembly incorporating the novel spring-loaded jaw forming this invention;

FIG. 2 is an isometric view of a knotter mechanism showing the relative positions of the novel spring-loaded jaw and closing cam;

FIG. 3 is an isometric view of the knotter hook assembly of FIG. 1, showing the action of the novel spring-loaded jaw with oversize twine;

FIG. 4 is a cross section through the hook member and jaw, taken on line 4—4 of FIG. 3;

FIG. 9 is a force diagram showing how adjustment of the spring-loaded jaw increases the jaw-opening torque radius for undersize twine and, thereby, enables a knot of undersize twine to "strip" from the billhook at a reduced force.

DESCRIPTION

Figure 5:
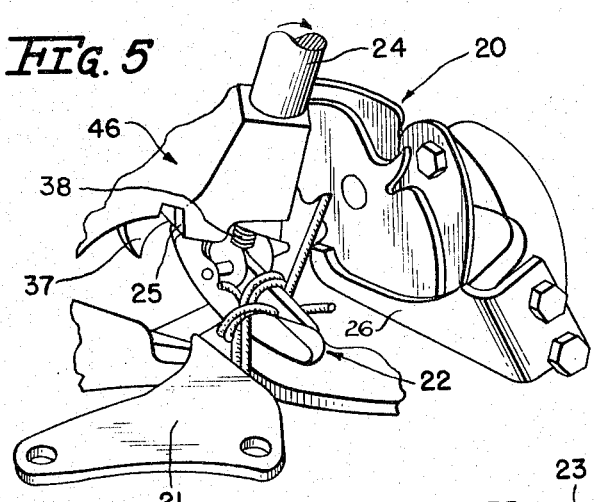
FIG. 5 is an isometric view of the knotter hook assembly of FIG. 1, showing the action of the novel spring-loaded jaw with undersize twine.

The novel knotter hook disclosed herein can be used with various makes of knotter mechanisms, one such mechanism (that of U.S. Patent No. 3,101,963) being used here as a setting for this invention. The knotter of the above patent comprises (FIG. 5) a twin disk cord-holder 20 for gripping the twine during the bale-forming and knot-tying operations, a rotary knotter hook assembly 22 for forming the knot, a breast plate 21 for supporting the twine in reach of the knotter hook assembly, a cam 25 for opening the jaw of the knotter hook to admit twine, and a cam 37 for closing the jaw of the knotter hook on the twine. Of these elements only the novel knotter hook assembly is described in detail here.

Figure 8:
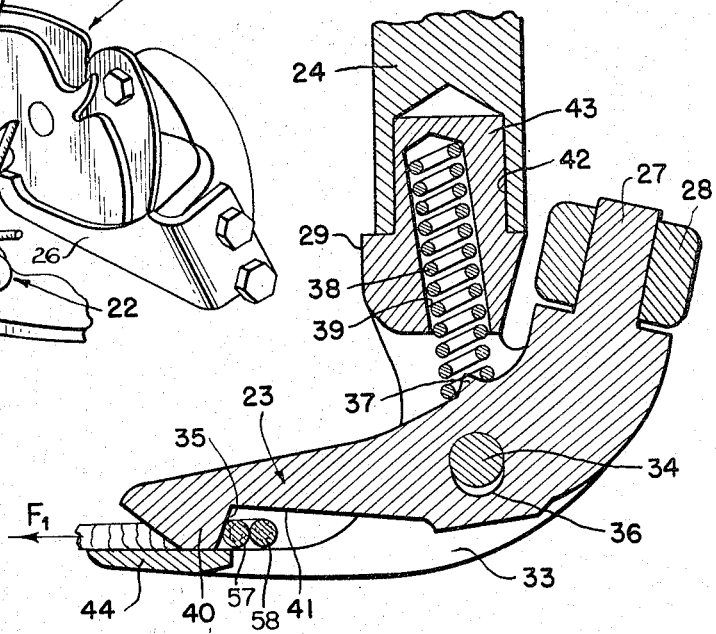
FIG. 8 is a section similar to that of FIG. 7, representing the undersize twine wrap of FIG. 5.
Figure 7:
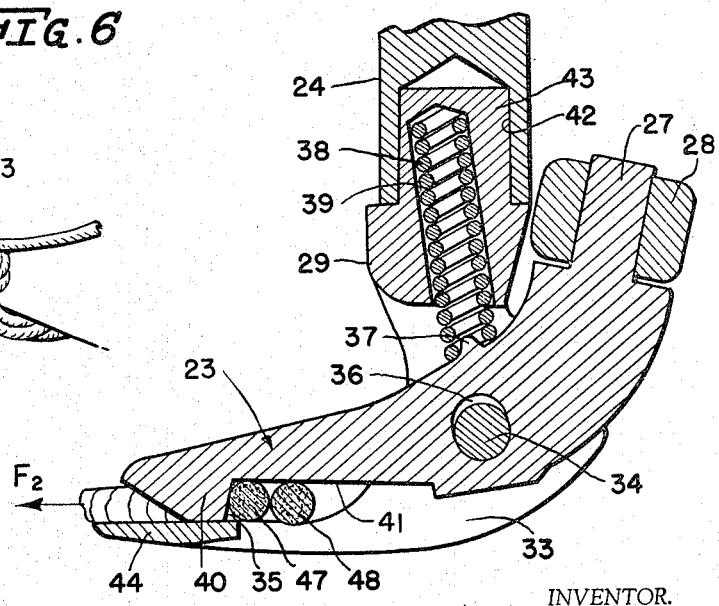
FIG. 7 is a section taken on line 7—7 of FIG. 6, representing the oversize twine wrap of FIG. 3.

Knotter hook assembly 22 (FIGS. 1, 7, 8) comprises a hook shaft 24, a hook member 29, a jaw 23, and a spring 38 of elastic material. The function of the knotter hook assembly is to twist the twine (in the manner described below) to shape the knot.

The hook shaft 24 is rotatably journalled in bearings in the frame 46 of the knotter unit. One end of the shaft carries a gear (not shown) by which the shaft is systematically rotated by the power train of the tying mechanism. The other end of the shaft (the end shown), contains a dead-end bore 42 for attachment of the knotter hook member 29.

Hook member 29 (FIGS. 1 and 7) is an L-shaped casting characterized by a shank 43 which is press-fitted into the bore 42 of shaft 24. The hook member contains a flat-sided slot 33 extending from the front to back, with the shank 43 bridging the slot. Extending upwardly from the under or slot side of the shank is a hole 39 for a coil spring 38. At the forward end of the hook member, the material remains intact, providing a flat, transverse portion 44 bridging the forward end of slot 33, and giving the forward end a U-shaped cross section. A pivot pin 34 for supporting the jaw 23 is rigidly attached to the walls of slot 33 and extends transversely thereof.

Jaw 23 (FIGS. 1 and 7) is a generally L-shaped casting containing a hook 40 at its toe end, an oval-shaped slot 36 intermediate its ends providing a way or guide for pivot pin 34, and a pin 27 at its heel end. The hook portion 40 includes two surfaces 35 and 41 against which the twine acts. Surface 35 retains the twine on the hook member 29, that is, when the jaw 23 is closed, surface 35 prevents the twine from sliding off of the toe of the hook member. The slope of surface 35 is critical in determining when jaw 23 will open to allow a knot to be stripped from the hook member 29, because the radius of the jaw-opening torque varies with the slope or angle of surface 35. Clamping surface 41 ordinarily exerts a grip on the twine. A roller 28 is mounted on pin 27 at the heel end of jaw 23, the roller providing a rolling contact between the jaw 23 and the cams 25 and 37 during rotation of shaft 24.

Jaw 23 fits into slot 33 of hook member 29, where it is pivotally supported on pin 34. Spring 38 projects downward from hole 39, bearing at its upper end against the bottom of the hole 39 and at its lower end against the top of jaw 23. Tab 37 on jaw 23 locates the spring lengthwise thereof. Spring 38 acts to bias the top of slot 36 of jaw 23 against the top of pin 34 but allows jaw 23 to yield upwardly when it is forced to do so by the twine. When jaw 23 is in closed position, hook portion 40 bears against the transverse bridge 44.

The novel aspects of the knotter hook assembly are best shown by tracing the operation of the knotter hook in forming a knot.

OPERATION

Figure 6:
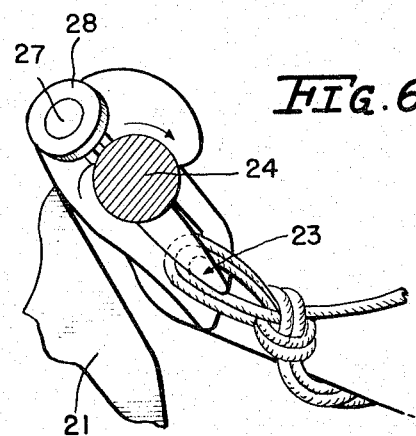
FIG. 6 is a plan view of the knotter hook assembly of FIG. 1, showing the completed knot being stripped from the billhook.

The knots shown in FIGS. 3, 5 and 6 are formed as follows: On completion of a bale, the two ends of the strand of twine encircling the bale extend over breastplate 21, past knotter hook assembly 22, to cordholder 20. Knotterhook assembly shaft 24 rotates clockwise, so that hook member 28 sweeps both strands of twine off of breastplate 21 and begins to wrap them around the knotterhook shank 43 in a loop. As knotterhook shaft 24 completes about three-quarters of a turn, roller 28 contacts jaw-opening cam 25 on frame 46 causing the jaw 23 to open and admit the two strands of twine. With further rotation, roller 28 engages jaw-closing cam 37, which forces jaw 23 shut on the strands of twine. If the twine is oversize, one advantage of the spring-loaded jaw 23 will be realized at this point in the knot-forming cycle.

When jaw 23 closes on oversize twine strands 47 and 48 (FIGS. 3, 7) the twine forces the jaw 23 to slide upward on pin 34. Twine gripping surface 41 is re-aligned, so that it extends over and contacts both strands of twine. U-shaped kinks are formed in the twine by virtue of the co-action between the jaw 23 and the slot 33 of hook member 29. If slot 36 and the spring 38 were not incorporated in jaw 23, the jaw would pivot about the axis shown in FIG. 8 and slope upwardly, contacting the innermost strand of twine 48 but having little clamping effect on the outermost strand of twine 47. The latter strand would be able to slip past jaw hook 40, resulting in a defective knot.

Resuming the description of the knot-forming cycle, shaft 24 continues to rotate, moving the twine past twine knife 26 (FIGS. 2 and 5) which cuts the twine and frees the bale from the twine supply. Concurrent movement of the bale towards the outlet of the bale chamber begins to "strip" the knot from the knotter hook. In the process of "stripping" the knot, the cordholder ends 49 and 50 of the strand of twine are temporarily hold on the knotter hook by the retaining wall 35 and the action of the spring-biased jaw-closing cam 37 (FIGS. 2–3) against roller 28. The strands of twine looping the knotter hook 22 are drawn off of the knotter hook and pass around the ends of the twine held by the cordholder 20 to form a knot (FIG. 6). The loop of twine in the jaws of the knotter hook in FIG. 6 exerts a force against wall 35 that overcomes the spring-biased closing cam 37 and opens jaw 23 of the knotter hook, thereby freeing the knot. The second advantage of the spring-loaded jaw 23 will be realized at this point in the knot-forming cycle if the twine happens to be undersize as at 57 and 58 in FIG. 8.

The second novel feature varies the moment arm of the force component exerting an opening torque on jaw 23 in accordance with the size of twine being used. The force pulling the knot has a component normal to the wall 35 tending to rotate jaw 23 about the axis of pin 34. Because the slot 36 enables the billhook 23 to slide up and down on pin 34 to adjust to the size of twine held within the knotter hook, the position of wall 35, of the force component normal thereto, and the length of the moment arm of the force component relative to the axis of pin 34 vary in accordance with the size of twine held by the jaw.

The angle of wall 35 is selected, therefore, so that the line of action of force component normal to wall 35 moves away from the axis of pin 34 when small twine is present in jaw 23. As the moment arm of the force component increases, the force required to open jaw 23 decreases. Because a smaller force is able to generate the torque needed to open the jaw 23 when undersize twine is present, the twine is less apt to break. This condition is shown graphically in the drawings, where: F–1 (FIG. 8) represents a reduced force; F–1N (FIG. 9) the component of F–1 normal to wall 35; $d_1$ (FIG. 9) the moment arm of F–1 about the axis of pin 34; F–2 (FIG. 7) the increased force used for the oversize twine; F–2N (FIG. 9) the component of F–2 normal to wall 35; and $d_2$ (FIG. 9) the moment arm of F–2 about pin 34.

The above description covers only the preferred mode of the present invention. The invention is not limited to that mode but embraces, as well, all equivalent forms that fall within the spirit and scope of the attached claims. For example, the pin 34 could be made integral with jaw 23 and slots provided for pin 34 in the walls of knotter hook member 29. Specific details are given as illustrations only and are not to be construed as limitations.

What is claimed is:

1. A knotter hook assembly, comprising: a hook member, a jaw, pivot means including a pivot axis mounting said jaw on said knotter hook member for pivotal movement of said jaw about said pivot axis, said pivot means permitting movement of said jaw relative to said knotter hook member along a path transverse to said pivot axis, elastic means acting on said jaw and biasing it toward one end of said path, whereby the position of said pivot axis changes in response to variations in the thickness of binding material employed with said knotter hook assembly.

2. A knotter hook assembly as recited in claim 1, wherein: said jaw includes a hook portion and said hook portion includes a sloping, twine-retaining surface.

3. A rotary knotter hook assembly for a twine knotter mechanism including a rotatable hook shaft, comprising: a hook member having a twine-gripping surface and means for attaching said hook member to said hook shaft, a jaw having a twine-gripping surface cooperable with said twine-gripping surface on said hook member, mounting means supporting said jaw on said hook member, said mounting means including a pivot pin and a slot, said pivot pin having a pivot axis and supporting said jaw for pivotal movement about said pivot axis, said slot forming a path extending transversely to said pivot axis, said pivot pin fitting into said slot, said pivot pin and said slot being movable relative to one another along said transverse path, and elastic means acting on said jaw to bias said pivot pin and a wall of said slot together, said elastic means further biasing said twine-gripping surfaces toward one another.

4. A knotter hook assembly as recited in claim 3, wherein: said jaw includes a hook portion and said hook portion includes a sloping, twine-retaining surface.

5. A knotter hook assembly, as recited in claim 4, wherein: said slot is in said jaw and said pivot pin is supported by said hook member.

6. A knotter hook assembly, as recited in claim 5, wherein: said slot is an elongated passage extending through said jaw, said pin is attached to said hook member and extends through said slot, and said elastic means comprises a coil spring interposed between said hook member and said jaw and biasing said jaw against said pivot pin at one end of said slot.

7. A knotter assembly, comprising: a frame having a bore therein; a jaw-opening cam on said frame adjacent one end of said bore, a spring-biased jaw-closing cam on said frame adjacent said one end thereof, a knotter hook journalled in said bore adjacent said one end thereof, a portion of said knotter hook having a substantially U-shaped cross-section, a pivot pin supported by said knotter hook member and extending into the opening of said U-shaped cross section, an arcuate jaw having an elongated slot therethrough and a twine retaining surface, said pivot pin extending into said slot to provide support for said billhook, a bore in said knotter hook, a coil spring in said bore and biasing said jaw against said pivot pin, a pin on one end of said jaw, a roller journalled on said pin for engagement with said cams, and a hook-shaped portion on the other end of said jaw for retaining binding material.

8. A rotary knotter hook assembly for a twine knotter mechanism including a rotatable hook shaft, comprising: a hook member having a twine-gripping surface and means for attaching said hook member to said hook shaft, a jaw having a twine-gripping surface cooperable with said twine-gripping surface on said hook member, mounting means supporting said jaw on said hook member, said mounting means including a pivot pin and pin guide means, said pivot pin having a pivot axis and supporting said jaw for pivotal movement about said pivot axis, said pin guide means comprising an elongated way having a stop at one end thereof, said pivot pin projecting into said elongated way, said pivot pin and said elongated way being movable relative to one another lengthwise of said elongated way, and spring means acting on said jaw and normally holding said pivot pin and said stop in contact with each other.

9. A knotter hook assembly as recited in claim 8, wherein: said jaw includes a hook-like toe portion having an angular twine-retaining surface displaced from said pivot axis, the angle of said twine-retaining surface co-acting with the force component of undersize twine normal to said surface to establish a longer moment arm about said pivot axis for undersize twine than for oversize twine.

References Cited by the Examiner

UNITED STATES PATENTS

| 249,248 | 11/1881 | Locke | 289—11 |
| 1,176,216 | 3/1916 | Hanson | 289—11 |

FOREIGN PATENTS

| 560,700 | 7/1923 | France. |
| 394,341 | 4/1924 | Germany. |

MERVIN STEIN, *Primary Eaminer.*

L. K. RIMRODT, *Examiner.*